2,809,897
Patented Oct. 15, 1957

2,809,897

FUNGICIDAL COATING COMPOSITIONS

Edward R. Christensen and John E. Tessieri, Beacon, N. Y., assignors to The Texas Company, New York, N. Y., a corporation of Delaware No Drawing. Application May 2, 1955, Serial No. 505,562

13 Claims. (Cl. 106—15)

This invention relates to fungus-resistant compositions, articles of manufacture made therewith, and process of making said articles. It is a continuation-in-part of our U. S. patent application Serial No. 259,886, entitled "Fungicidal Coating Compositions," filed on December 4, 1951, now abandoned.

Broadly the composition of our invention comprises asphalt and 0.05–10% of a salt of dithiofuroic acid selected from the group consisting of groups I and II metal salts. Foraminous solid surfaces can be rendered fungus-resistant by application thereto of our composition in liquid state. A specific embodiment of the present invention is a shingle comprising a base of roofing felt coated with the instant composition.

We have found that the dithiofuroic acid salts of group I metals, for example sodium and potassium salts, are adapted for use in a water vehicle, whereas the salts of group II metals, for example, zinc and barium dithiofuroates, are adapted for use in an oil vehicle. Because of this adaptability our composition containing a group II metal salt of dithiofuroic acid can be utilized in molten state, or cutback with organic solvents such as liquid hydrocarbons, while the composition containing a group I salt of the acid can be utilized as a water emulsion. In particular we have found that the compositions of this invention are exceptionally thermally stable and adaptable to high temperature processing without substantial deterioration, and they do not exhibit an objectionable odor.

Dithiofuroic acid has the formula

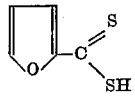

and is prepared by the use of phosphorous pentasulfide on furoic acid or ammonium polysulfide on furfural. Metal salts of dithiofuroic acid are prepared directly from furfural by the use of ammonium polysulfide and subsequent reaction with a hydroxide or a halide of a group I or II metal; for example, zinc dithiofuroate is prepared by reacting furfural with ammonium polysulfide and treating the product with zinc chloride.

The fungicidal activity of the instant dithiofuroic acid salts was determined against a mixture of fungi which is commonly designated the JAN mixture, since it is prescribed in joint Army-Navy specifications as the test organisms for evaluating fungus-resistant varnish. The JAN mixture comprises the following organisms: *Aspergillus niger, Aspergillus flavus, Penicillium luteum* and *Trichoderma T-1*. The test procedure followed in determining the activity of the novel fungicides of this invention comprises the following steps: an agar substrate containing the fungicide was placed in a Petri dish and sterilized; after cooling, the Petri dish was inoculated in the center of the dish with a small mycelial transplant or spore suspension of the JAN fungi; three to five replicates of each test material were prepared and the radial growth of the fungi in the test and control dishes was measured at regular intervals; after a week the distance of radial growth was plotted as a function of time and there were obtained straight lines of different slope for the test and control dishes. The degree of inhibition is determined as the ratio of the difference between the radial growth in the control dish and the radial growth in the test dish to the radial growth in the control dish for the same time interval. This procedure places the test on a quantitative basis and provides a scale for comparison of results between different tests.

In the following table there is shown the results of quantitative fungitoxicity tests made in accordance with the above-outlined procedure. Sodium and zinc salts of dithiofuroic acid were compared with commercially available fungicides at various concentrations of fungicides, and it was established that dithiofuroate salts are superior to several commercially available fungicides.

| Concentration, Percent | Percent Inhibition of JAN Mixture Growth at Various Concentrations of Fungicide | | |
|---|---|---|---|
| | 1.0 | 0.5 | 0.1 |
| Zn dithiofuroate | 100 | 100 | 95 |
| Na dithiofuroate | 100 | 100 | 21 |
| Vancide [1] | 100 | 84 | 45 |
| Dowicide [1] | 100 | 95 | 63 |

[1] Commercially available fungicides; Vancide is an aqueous solution of the sodium salts of mercaptobenzothiazole and dimethyldithiocarbamic acid; Dowicide is tetrachlorophenol.

The asphalt in our composition can be a natural asphalt such as Trinidad asphalt or gilsonite, but for efficiency and economy, we prefer to use a petroleum asphalt. Petroleum asphalt can be obtained from certain types of crude oil, from refinery residua, and from the deasphalting of lubricating stocks. Such asphalt can have been reduced in consistency by steam or air blowing, vacuum distillation, or by a combination of these techniques. Advantageously, for the coating of membranes such as cloth, roofing felt, paper, glass fiber mat and the like, the asphalt should be fluid at time of application, e. g. molten, cutback, or in an emulsion. To obtain a good coating with molten asphalt temperature of the asphalt should be about 400–500° F., preferably about 450° F., penetration below about 150, preferably between 10 and 50 and melting point above 100° F., preferably between about 150 and 300° F. All asphalt characteristics referred to herein follow the test procedures described in the April 1953 handbook entitled ASTM Standards on Bituminous Constructional Materials, published by the American Society for Testing Materials. All percentages herein are weight percentages.

The exceptional thermal stability and excellent fungus resistance of materials coated with the composition of this invention are demonstrated in the manufacture and testing of a fungus resistant asphalt shingle. Zinc dithiofuroate was added to asphalt shingle saturant at 450° F. in an amount equivalent to 1% concentration of fungicide in the saturant. The saturant was an air-blown asphaltic residuum from distillation of a crude petroleum oil; it had melting point between 200° and 250° F., penetration at 77° F. between 22 and 25, and a flash point above 500° F. The composition both hot and cold appeared to be completely compatible. No decomposition of the fungicide was observed. A strip of roofing felt, a heavy porous paper mat, was then dipped in the saturant, removed, and hardened by cooling to give an asphalt shingle. A sample of shingle thus prepared was sterilized in a Petri dish, inoculated with 1 cc. of a spore suspension of the JAN fungi and subject to incubation.

After seven days of incubation no fungal growth was observed in the asphalt shingle coated with the novel shingle saturant, but a control sample of shingle made with roofing felt and the same kind of asphalt saturant not containing the dithiofuroate salt, showed fungal growth on the surface of the asphalt and on the exposed felt edge.

In place of the above molten asphalt saturant a cutback or emulsified asphalt saturant can also be used. In cutback petroleum asphalt the dithiofuroate salt of a group II metal can be added to the cutback mixture, to molten asphalt, or to the cutting solvent, e. g., a petroleum naphtha having boiling range from 130° to 400° F., a kerosene road oil distillate boiling from 330–480° F., or a gas oil having initial boiling point of about 460° F. In asphalt emulsions a group I metal salt of dithiofuroic acid, preferably sodium dithiofuroate, can be dissolved in the water used for making the emulsion. The salts can be incorporated in the compositions in amounts equivalent to 0.05 to 10% of the total composition, but ordinarily, for efficiency and economy in the practice of our invention, the dithiofuroate salts will constitute 0.1 to 2% of the composition.

In addition to making fungus-resistant shingles the coating composition of my invention is useful for preserving wood and other materials subject to fungal attack and rot, e. g., the buried portion of telephone poles, exposed and buried piling, structural timbers, and pipe line wrapping.

Obviously, many modifications and variations of the invention, as hereinbefore set forth, may be made without departing from the spirit and scope thereof and, therefore, only such limitations should be imposed as are indicated in the appended claims.

We claim:

1. A fungus-resistant composition consisting essentially of asphalt and 0.05–10% of a salt of dithiofuroic acid selected from the group consisting of groups I and II metal salts.

2. A fungus-resistant composition consisting essentially of asphalt and 0.05–10% of a group II metal salt of dithiofuroic acid.

3. The composition of claim 2 wherein said salt is zinc dithiofuroate.

4. A fungus-resistant composition for application to foraminous material consisting essentially of 0.1–2% of a group II metal salt of dithiofuroic acid incorporated in molten petroleum asphalt.

5. The composition of claim 4 wherein said metal salt is a zinc salt.

6. A fungus-resistant composition for application to foraminous material consisting essentially of 0.1 to 2% of a group II metal salt of dithiofuroic acid incorporated in cutback petroleum asphalt.

7. A composition of claim 6 wherein said metal salt is a zinc salt.

8. A fungus-resistant composition for foraminous material consisting essentially of 0.1 to 2% of a group I metal salt of dithiofuroic acid incorporated in a water emulsion of petroleum asphalt.

9. A composition of claim 8 wherein said metal salt is a sodium salt.

10. A process for preparing a fungus-resistant membrane which comprises incorporating 0.1 to 2% of a group II metal salt of dithiofuroic acid in molten petroleum asphalt at temperature of about 450° F., and coating a membrane with said salt-containing asphalt.

11. The process of claim 10 wherein said metal salt is a zinc salt.

12. The process of claim 11 wherein said petroleum asphalt has penetration below about 150 and melting point of at least about 100° F.

13. An asphalt shingle comprising a base of roofing felt coated with petroleum asphalt having incorporated therein 0.1–2% of zinc dithiofuroate.

References Cited in the file of this patent

UNITED STATES PATENTS

| | | |
|---|---|---|
| 1,554,642 | Miner | Sept. 22, 1925 |
| 2,364,460 | McLean | Dec. 5, 1944 |
| 2,685,523 | Cross et al. | Aug. 3, 1954 |

OTHER REFERENCES

"Furfural and Its Derivatives," Bulletin No. 2, September 1925, pub. by Miner Laboratories, Chicago, Ill. (page 19 relied on).

"Biochemical Journal," vol. 40, No. 3, 1946 (page 333 relied on).